(12) United States Patent
Jeon

(10) Patent No.: US 7,458,649 B2
(45) Date of Patent: Dec. 2, 2008

(54) ELECTRIC PARKING BRAKE FOR VEHICLES HAVING OPERATING LOAD MEASURING DEVICE

(75) Inventor: Jae-Woo Jeon, Gyeonggi-do (KR)

(73) Assignee: Hyundai Mobis Co., Ltd., Seoul (KR)

( * ) Notice: Subject to any disclaimer, the term of this patent is extended or adjusted under 35 U.S.C. 154(b) by 0 days.

(21) Appl. No.: 11/533,198

(22) Filed: Sep. 19, 2006

(65) Prior Publication Data

US 2007/0296269 A1    Dec. 27, 2007

(30) Foreign Application Priority Data

Jun. 23, 2006    (KR) .................. 10-2006-0056825

(51) Int. Cl.
*B60R 25/08* (2006.01)
*F16D 69/00* (2006.01)

(52) U.S. Cl. .................. 303/89; 188/265; 188/2 D; 303/191

(58) Field of Classification Search .................. 303/89, 303/191, 2 D; 188/265, 2 D
See application file for complete search history.

(56) References Cited

U.S. PATENT DOCUMENTS

| | | | | |
|---|---|---|---|---|
| 5,590,744 A | * | 1/1997 | Belmond | 188/265 |
| 2001/0033106 A1 | * | 10/2001 | Shirai et al. | 303/177 |
| 2003/0066714 A1 | | 4/2003 | Flynn et al. | |
| 2003/0227010 A1 | * | 12/2003 | Petrak | 254/294 |
| 2005/0115774 A1 | | 6/2005 | Nieto Gil et al. | |
| 2005/0189183 A1 | * | 9/2005 | Gil et al. | 188/2 D |
| 2005/0225166 A1 | | 10/2005 | Greenberg et al. | |

FOREIGN PATENT DOCUMENTS

| | | |
|---|---|---|
| JP | 2000-211485 | 8/2000 |
| JP | 2003-327099 | 11/2003 |
| JP | 2004-142519 | 5/2004 |
| JP | 2004-161101 | 6/2004 |
| WO | WO9856633 | * 12/1998 |

OTHER PUBLICATIONS

English Language Abstract of JP 8-127317.
English Language Abstract of JP 2000-211485.
English Language Abstract of JP 2003-327099.
English Language Abstract of JP 2004-142519.
English Language Abstract of JP 2004-161101.

* cited by examiner

*Primary Examiner*—Robert A. Siconolfi
*Assistant Examiner*—Mahbubur Rashid
(74) *Attorney, Agent, or Firm*—Greenblum & Bernstein, P.L.C.

(57) ABSTRACT

An electric parking brake includes an actuating device, which provides a force to lock and unlock the parking brake using power supplied by manipulation of a control button, and an equalizer, which is coupled at a first end thereof to the actuating device and is coupled at a second end thereof to a parking cable to pull or release the parking cable, which operates a braking device of a wheel, depending on operation of the actuating device. The electric parking brake further includes an operating load measuring unit, which measures operating load that pulls the equalizer in the parking cable and sends the measured signal to an ECU that controls the actuating device.

4 Claims, 2 Drawing Sheets

ELECTRIC PARKING BRAKE FOR VEHICLES HAVING OPERATING LOAD MEASURING DEVICE

CROSS-REFERENCE TO RELATED APPLICATIONS

The present application is based on, and claims priority from, Korean Application Serial Number 10-2006-0056825, filed on Jun. 23, 2006, the disclosure of which is hereby incorporated by reference herein in its entirety.

FIELD OF THE INVENTION

The present invention relates to parking brakes for vehicles and, more particularly to an electric parking brake for vehicles which measures an operating load using a piezoelectric sensor.

BACKGROUND OF THE INVENTION

Generally, when parking vehicles, users manipulate parking brakes to prevent the vehicles from undesirably moving before getting out of the vehicles.

In such a parking brake, force applied to a parking cable when a parking brake lever is pulled is evenly transmitted to braking devices of wheels through an equalizer. The braking devices hold the respective wheels, thus preventing the vehicle from undesirably moving.

As such, in the case where the wheels are braked by manipulation of the parking brake lever, it forces a user to manually manipulate the parking brake lever when conducting the parking brake operation, thus being inconvenient to the user. Furthermore, because the user may forget to conduct the parking brake operation, there is a possibility of a safety hazard.

In an effort to overcome the problems experienced with the conventional manual parking brake, there has been proposed and used an electric parking brake, which easily conducts the parking brake operation using driving force of a motor, and which reliably maintains the braked state. In the electric parking brake, when the motor is operated by manipulating a control switch, a parking cable is pulled by the rotation of the motor; thereby braking force is evenly transmitted to wheels through an equalizer.

In such electric parking brake, a process of measuring the intensity of tensioning force applied to the parking cable by the motor must be reliably conducted. For this, typically, a force generated by changing the displacement of a spring is measured, and the measured force value is used to maintain the locked state of the parking cable and for controlling the drive force of the motor more precisely. However, the spring displacement type operating load sensor used in the conventional electric parking brake requires separate elements, such as a magnetic device for detecting displacements of the spring and a hall IC, so that the process of assembling it is complex.

Furthermore, in the spring displacement type operating load sensor, which uses displacement of the spring to measure the operating load, a loss stroke of the spring, which is irrelevant to measuring the operating load, occurs during the stroke of the spring. In addition, there is a problem in that the modulus of elasticity of the spring varies depending on the temperature.

SUMMARY OF THE INVENTION

Embodiments of the present invention provide an electric parking brake having an operating load measuring device which measures an operating load using a current value that varies depending on the intensity of the operating load, thus preventing a problem of the conventional art, in which a loss stroke of a spring occurs, and preventing the measured value from varying depending on the temperature, and which has a stricture such that the operating load measuring device directly receives the operating load during a process of measuring it, thus ensuring the reliability of the measured value, and reducing the number of parts.

Furthermore, the embodiments of the present invention provide an electric parking brake in which the size of the operating load measuring device is reduced by simplifying the parts thereof and by reducing the number of parts, thus reducing the overall size of the electric parking brake.

An electric parking brake having an operating load measuring device according, to an embodiment of the present invention includes an actuating device. The actuating device includes a motor provided in a housing having a predetermined shape and reversibly rotating in response to a control signal. A pair of gear units engages with each other through gears formed on circumferential outer surfaces thereof and is rotated through engagement with an output shaft of the motor. A screw rod is coupled to the gear units by a screw coupling method so that the screw rod is linearly moved by rotation of the gear unit, thus providing force for locking and unlocking the parking brake. An equalizer is coupled to at a first end thereof to the actuating device and is coupled at a second end thereof to a parking cable to pull or loosen the parking cable, which operates a braking device of a wheel, in response to operation of the actuating device. An operating load measuring unit changes an intensity of current (voltage) depending on an intensity of tensioning force of the actuating device, which pulls the equalizer. An ECU determines an intensity of the operating load, generated by operating the actuating device, using a signal transmitted from the operating load measuring unit. The ECU controls the actuating device through a feedback control method.

The operating load measuring unit includes a casing having a space therein such that a cable connection end of the screw rod is inserted into and fastened to a first end of the casing and an equalizer connection shaft extends outside a second end of the casing. A movable compressing member is fastened to the equalizer connection shaft in the casing at a position spaced apart from an inner surface of the casing by a predetermined distance. A piezoelectric sensor is provided between the inner surface of the casing and the movable compressing member and changes a resistance value thereof using a compressing force applied thereto by movement of the screw rod. An amplifier transmits the changed resistance value to the ECU.

BRIEF DESCRIPTION OF THE DRAWINGS

For a better understanding of the nature and objects of the present invention reference should be made to the following detailed description with the accompanying drawings, in which.

DETAILED DESCRIPTION OF THE PREFERRED EMBODIMENTS

Hereinafter, a preferred embodiment of the present invention will be described in detail with reference to the attached drawings.

Figure 1:
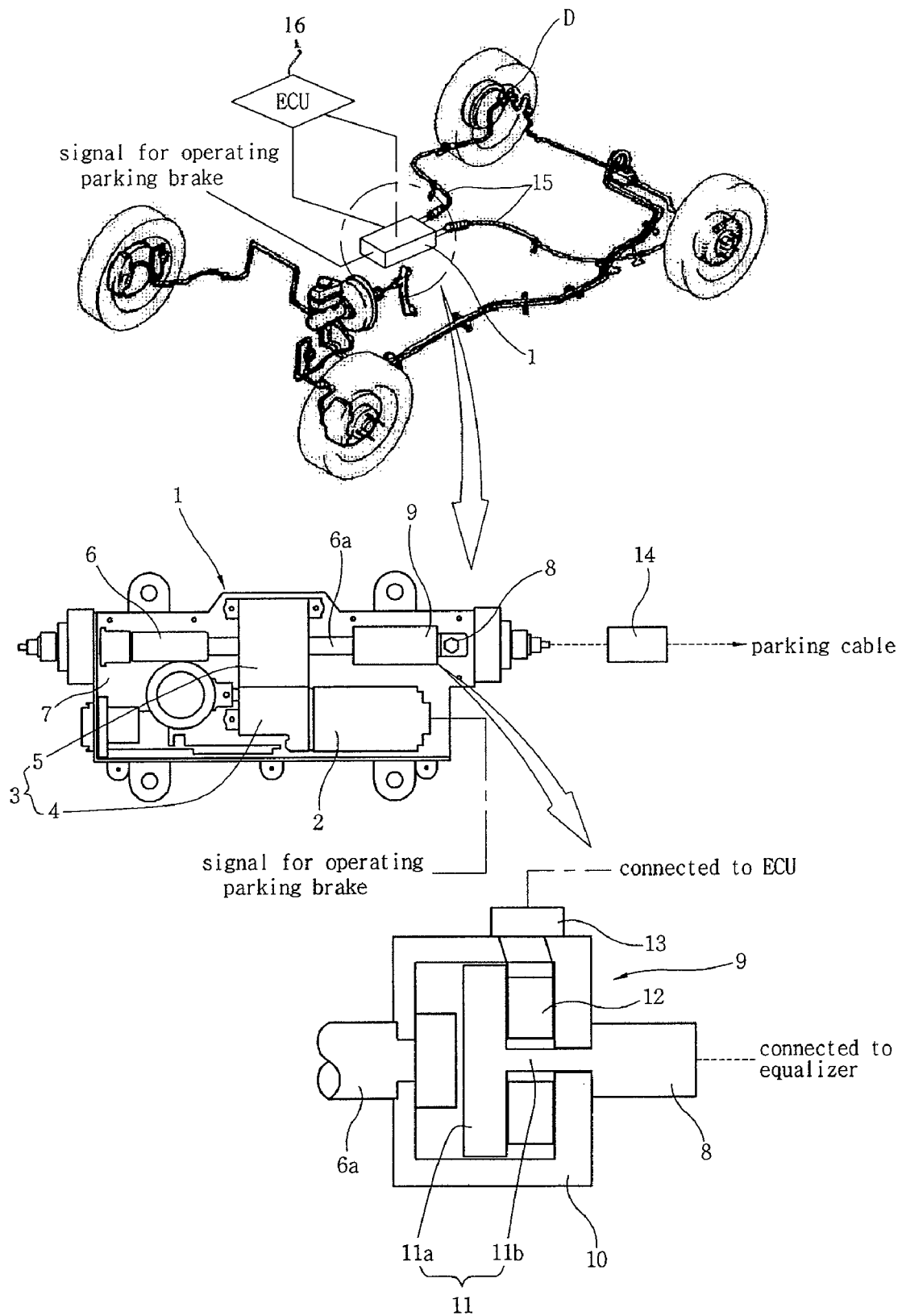
FIG. 1 is a schematic view of an electric parking brake for vehicles having an operating load measuring device, according to the present invention.

FIG. 1 is a schematic view of an electric parking brake for vehicles having an operating load measuring device, according to the present invention. As shown in the drawing, the electric parking brake of the present invention includes an actuating device 1, which provides a force for locking or unlocking the parking brake using power supplied by manipulation of a control button, and an equalizer 14, which is coupled at a first end thereof to the actuating device 1 and is coupled at a second end thereof to a parking cable 15 to pull or release the parking cable 15, which operates a braking device D of a wheel, in response to operation of the actuating device 1. The electric parking brake of the present invention further includes an operating load measuring unit 9, which measures operating load that pulls the equalizer 14 in the parking cable 15 and sends the measured signal to an ECU (electric control unit) 16 that controls the actuating device 1.

The actuating device 1 includes a motor 2, which is provided in a housing 7 having a predetermined shape and rotates in a forward direction (a direction in which a locking force is generated) or in a reverse direction (a direction in which a releasing force is generated) in response to a control signal, a pair of gear units 3 which engage with the output shaft of the motor 2, and a screw rod 6, which generates a linear moving force for pulling or releasing the equalizer 14 depending on rotation of the gear units 3.

The gear units 3 include a drive gear 4, which engages with a pinion of the motor 2, and a driven gear 5, which engages with the drive gear 4 through helical engagement and is coupled to the screw rod 6, which is inserted through the center of the driven gear 5, by a screw coupling method, thus linearly moving the screw rod 6.

The screw rod 6 has an external thread on the circumferential outer surface thereof and engages with an internal thread, which is formed on the circumferential inner surface of the driven gear 5. Thus, the screw rod 6 is linearly advanced or retracted depending on the direction in which the driven gear 5 is rotated.

The operating load measuring unit 9 couples a cable connection end 6a, which is an end of the screw rod 6 of the actuating device 1, to an equalizer connection shaft 8 which is disposed on the same axis as the screw rod 6 at a position facing the cable connection end 6a, and an end of which extends outside the housing 7 of the actuating device 1 and is coupled to the equalizer 14.

The operating load measuring unit 9 includes a casing 10, which has a space therein such that the cable connection end 6a of the screw rod 6 is inserted into and fastened to a first end of the casing 10, and the equalizer connection shaft 8 extends outside the second end of the casing 10, and a movable compressing member 11, which has a "┤"shape and is fastened to the equalizer connection shaft 8 in the casing 10 at a position spaced apart from the inner surface of the casing, 10 by a predetermined distance. The operating load measuring unit 9 further includes a piezoelectric sensor 12, which is provided between the inner surface of the casing 10 and the movable compressing member 11 and changes a resistance value thereof depending on a compressing force applied by movement of the screw rod 6, and the ECU 16, which calculates the operating load value applied to the parking cable 15 by a drive force generated by the actuating device 1, using the varying value of the piezoelectric sensor 12 transmitted through an amplifier 13.

The movable compressing member 11 includes a connection shaft 11b, which has a relatively small diameter and is fastened to the equalizer connection shaft 8 while maintaining a position spaced apart from the inner surface of the casing 10 by a predetermined distance, and a compressing flange 11a, which is coupled to an end of the connection shaft 11b and has a relatively large diameter.

Here, the movable compressing member 11 is fastened to the equalizer connection shaft 8 by welding or by a bolt coupling method. In the case that the casing 10 is separable, the movable compressing member 11 may be integrated with the equalizer connection shaft 8.

Furthermore, the cable connection end 6a of the screw rod 6 is fastened to the inner surface of the casing 10 or the outer surface of the casing 10 such that the casing 10 is reliably pulled or pushed by linear movement of the cable connection end 6a of the screw rod 6. For this, the cable connection end 6a is fastened to the casing 10 by a bolt coupling method, by welding or by engagement therewith.

Meanwhile, the piezoelectric sensor 12 can use any method using physical characteristics in which a resulting value varies depending on the applied pressing force, for example, uses a piezoelectric effect in which a current, voltage or resistance value varies depending on the intensity of a pressing force, or a method, for example, a strain gauge, which varies a current, voltage or resistance value depending on the intensity of applied pressure. The reason for this is that, in methods that use values that change in response to applied force as input values, the input values can be processed by the same method.

Hereinafter, the operation of the present invention will be explained in detail with reference to the attached drawings.

In the electric parking brake of the present invention, when the control button, which is provided near a driver's seat, is manipulated, the motor is operated. The parking brake is thus operated by the drive force of the motor, and thus the wheel W is locked or unlocked. Here, while the parking brake is operated, the driving force of tile motor can be more precisely controlled by measuring the tension applied to the parking cable 15.

In detail, the operation of the electric parking brake to lock the wheel W will be explained herein below. As shown in FIG. 1, when the motor 2 of the actuating device 1 is rotated in one direction (in which the locking operation is conducted) in response to a control signal from the control button, the gear units 3, which engage with the motor 2, are rotated. That is, the motor 2, the drive gear 4 and the driven gear 5 are sequentially rotated. Thereby, the screw rod 6, which is placed through the center of the driven gear 5, is linearly moved to the left in FIG. 1, that is, in the direction in which the parking cable is pulled.

Then, the equalizer 14, which is coupled to the equalizer connection shaft 8 through the operating load measuring unit 9 to which the cable connection end 6a is fastened, is pulled in the same direction by the linear movement of the screw rod 6. Furthermore, the parking cable 15 is also pulled in the same direction in which the equalizer 14 is moved. Thereby, the braking device D of the wheel is operated, thus entering the locked state.

Meanwhile, to unlock the parking brake from the locked state and to thus release the wheel, the motor 2 of the actuating device 1 is rotated in a reverse direction (that is, in the direction opposite the locking direction) by manipulating the control button. Thereby, the gear units 3, which engage with the motor 2, are rotated in the direction opposite the direction in which the locking operation is conducted, so that the screw rod 6 is linearly moved in the direction (in which the parking cable is loosened, that is, to the right in FIG. 1) opposite the direction in which the locking operation is conducted.

Then, the tension, which has been applied to the parking cable 15 by the actuating device 1, is removed, and the braking device D, which has been operated by the parking cable 15, is unlocked. Thus, the wheel W is converted from the locked state to the unlocked state.

Meanwhile, during the locking or unlocking operation of the parking brake, the present invention measures the intensity of the tension applied from the actuating device 1 to the parking cable 15, thus preventing malfunction of the braking device D. For this, the operating load measuring unit 9, which is provided between the actuating device 1 and tile equalizer 14, measures the operating load, and the ECU 16 precisely controls the driving force of the motor using the measured operating load value, thus ensuring the reliability of the locking force of the parking brake.

Figure 2:
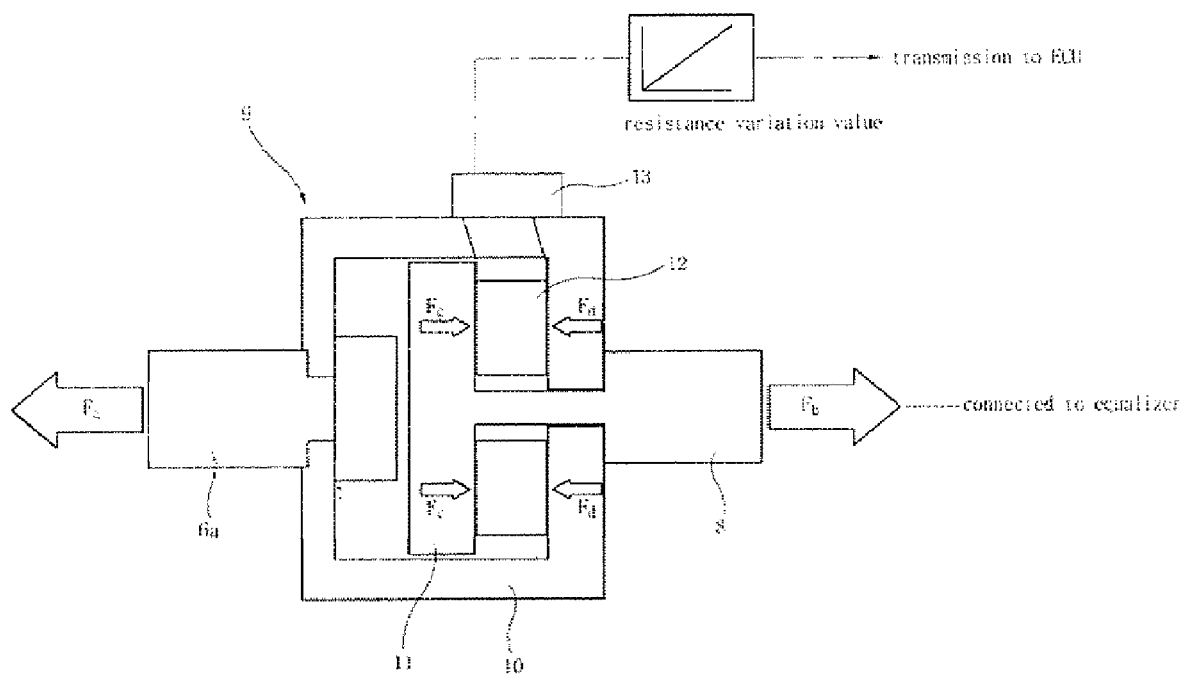
FIG. 2 is a view showing the operation of the operating load measuring device of FIG. 1 using a piezoelectric sensors

That is, as shown in FIG. 2, in the operating load measuring unit 9, when the parking brake is operated, a pulling force Fa, which is generated by linear movement of the screw rod 6 by the motor 2 through the gear units 3, is applied to the casing 10, which is coupled to the cable connection end 6a of the screw rod 6, in the same direction as the direction in which the screw rod 6 is moved. The pulling force Fa of the cable connection end 6a pulls the equalizer connection shaft S, which is fastened to the equalizer 14, in the same direction, and thus pulls the parking cable 15. Simultaneously, the pulling force Fa compresses the piezoelectric sensor 12 along with the reaction force of the movable compressing member 11, thus varying the initial resistance value of the piezoelectric sensor 12 through variation in current or voltage thereof In detail,due to the pulling force Fa of the cable connection end 6a, the casing 10 receives a compressing force Fd in the same direction as that of the pulling force Fa. Then, the reaction force Fc is generated in the movable compressing member 11, which is fastened to the equalizer connection shaft 8, in the direction opposite the direction of the compressing force Fd of the casing 10. Here, the difference between the compressing force Fd and the reaction force Fe is the operating load (Fb, shown in FIG. 2), which is applied to the equalizer connection shaft 8.

As such, when the piezoelectric sensor 12 is compressed by the compressing force Fd and the reaction force Fe, which act in opposite directions in the casing 10 of the operating load measuring unit 9, the resistance value of the piezoelectric sensor 12 varies in response to variation in current or voltage according to the physical characteristic of the piezoelectric sensor 12 in which a current or voltage value thereof varies when the shape thereof is changed by force. The difference between the changed resistance values, corresponding to changed current or voltage values when force is applied thereto and when no force is applied thereto, is transmitted to the ECU 16 after being amplified by the amplifier 13.

Here, for convenience of description, although a difference value of the piezoelectric sensor 12 is designated by resistance values in FIG. 2, current or voltage values may be used for determining the difference value for the signal to be transmitted from the piezoelectric sensor 12 to the ECU 16.

The ECU 16, which has received tile difference value of the piezoelectric sensor 12, determines the operating load value that matches the difference value of the piezoelectric sensor 12. Because the determined operating load value is a practical operating load value, which is being applied to the parking cable 15 through the actuating device l, the ECU16 monitors the locked state of the parking brake using the operating load values and controls the actuating device 1 such that the parking brake can maintain optimum locking force until the parking brake is unlocked.

Here, in the ECU 16, a method of controlling the actuating device 1 is conducted by a typical feedback control method using difference values transmitted from the piezoelectric sensor 12, therefore further explanation is deemed unnecessary. Furthermore, a method of determining an operating load value using the difference value of the piezoelectric sensor 12 is conducted using a data map, which includes experimentally obtained data on operating load values matching current, voltage or resistance values that vary depending on loads applied to the piezoelectric sensor. This method is a typical method for matching an output value to an input value.

As is apparent from the foregoing, in the present invention, because the intensity of an operating load applied to a parking cable when a parking brake is operated is measured using a piezoelectric effect, a process of converting the operating load is not required in a process of measuring the intensity of the operating load, and the present invention is not affected by varying in circumstances, such as temperature. Therefore, the present invention is advantageous in that the reliability of the measured value is ensured.

In addition, the present invention is provided in an actuating device for generating driving force and is able to measure the operating load using only compressing force applied in the same direction as that of a power transmission path, so that the size of the operating load measuring part and the overall size of the actuating device are markedly reduced, thus having a compact structure.

The invention claimed is:

1. An electric parking brake for vehicles having an operating load measuring device, comprising:

an actuating device, comprising a motor provided in a housing having a predetermined shape and reversibly rotating in response to a control signal, a pair of gear units engaging with each other through gears formed on circumferential outer surfaces thereof, and rotated through engagement with an output shaft of the motor, and a screw rod coupled to the gear units by a screw coupling so that the screw rod is linearly moved by rotation of the gear unit, thus providing force to lock and unlock the parking brake;

an equalizer coupled at a first end thereof to the actuating device and coupled at a second end thereof to a parking cable to pull or loosen the parking cable, which operates a braking device of a wheel, in response to operation of the actuating device;

an operating load measuring unit changing an intensity of current (voltage) depending on an intensity of tensioning force of the actuating device, which pulls the equalizer; and an ECU determining an intensity of the operating load, generated by operating the actuating device, using a signal transmitted from the operating load measuring unit, the ECU controlling the actuating device through a feedback control methods wherein the operating load measuring unit comprises:

a casing having a space therein such that a cable connection end of the screw rod is inserted into and fastened to a first end of the casing and an equalizer connection shaft extends outside a second end of the casing;

a movable compressing member fastened to the equalizer connection shaft in the casing at a position spaced apart from an inner surface of the casing by a predetermined distance; and a piezoelectric sensor provided between the inner surface of the casing and the movable compressing member, and wherein the movable compressing member comprises:
a connection shaft having a predetermined diameter and fastened to the equalizer connection shaft while maintaining a position spaced apart from the inner surface of the casing by a predetermined distance; and
a compressing flange having a diameter larger than the diameter of the connection shaft and provided on an end of the connection shaft.

2. The electric parking brake as defined in claim 1, wherein the operating load measuring unit is provided in the actuating device.

3. The electric parking brake as defined in claim 2, wherein the operating load measuring unit is disposed along an axis equal to an axis of the screw rod provided in the actuating device.

4. The electric parking brake as defined in claim 1, wherein the operating load measuring unit further comprises an amplifier transmitting the changed resistance value to the ECU, and the piezoelectric sensor changes a resistance value thereof using a compressing force applied thereto by movement of the screw rod.

* * * * *

UNITED STATES PATENT AND TRADEMARK OFFICE
CERTIFICATE OF CORRECTION

PATENT NO. : 7,458,649 B2 Page 1 of 1
APPLICATION NO. : 11/533198
DATED : December 2, 2008
INVENTOR(S) : J. Jeon It is certified that error appears in the above-identified patent and that said Letters Patent is hereby corrected as shown below:

At Column 6, Line 58 (Claim 1, Line 26) "methods" should be --method,--.

Signed and Sealed this

Second Day of June, 2009

JOHN DOLL
*Acting Director of the United States Patent and Trademark Office*